United States Patent [19]

Tokita et al.

[11] Patent Number: 5,030,461

[45] Date of Patent: Jul. 9, 1991

[54] COLORED SHOYU (SOY SAUCE)

[75] Inventors: Hiroshi Tokita, Oyama; Isamu Matsui, Imaichi; Hiroyuki Hasegawa, Utsunomiya; Susumu Taima, Kasukabe; Kensuke Ohyoshi, Tatebayashi; Hisao Sugita, Shimodate; Shigeru Tsuchida, Mouka, all of Japan

[73] Assignee: Frontier Tochigi Co-operative, Japan

[21] Appl. No.: 401,991

[22] Filed: Sep. 1, 1989

[51] Int. Cl.⁵ ................................................ A23L 1/27
[52] U.S. Cl. ..................................... 426/253; 426/256
[58] Field of Search ........................... 426/253–261, 426/589

[56] References Cited

U.S. PATENT DOCUMENTS 1,412,523  4/1922  Hochstadter .................. 426/255
2,019,030  10/1935  Tucker ........................... 426/255
2,615,813  10/1952  Malter ........................... 426/261
2,692,831  10/1954  Weckel .......................... 426/253
3,151,985  10/1964  Fobes ............................ 426/254

FOREIGN PATENT DOCUMENTS 075587  6/1970  Japan ............................ 426/253

Primary Examiner—Jeanette Hunter
Attorney, Agent, or Firm—Bruce L. Adams; Van C. Wilks

[57] ABSTRACT

Shoyu, a liquid seasoning, has a blackish purple or blackish brown color, however, such color peculiar to the conventional shoyu is decolored and the shoyu is colored various colors such as red, blue, yellow, green, etc., whereby the conventional shoyu can be improved into one which is available in a variety of colors while maintaining the taste, aroma and flavor peculiar to the conventional shoyu.

22 Claims, No Drawings

COLORED SHOYU (SOY SAUCE)

BACKGROUND OF THE INVENTION

The present invention relates to an improved shoyu or soy sauce. Shoyu is an original and traditional Japanese liquid seasoning indispensable for the eating habits of the Japanese. Shoyu has been exported to many countries of the world such as those in the American Continent, Europe, Asia, Oceania, etc. from about several tens of years ago. Today, Shoyu is used not only for the traditional Japanese cuisine (cooking) also as a seasoning for a variety of cuisines including frizzled food such as frizzled vegetable or meat and as one of the main materials of barbecue sauces in many countries. In the American Continent and Southeast Asia, shoyu is manufactured in the local factories to meet the expanding local demand.

Normally, the shoyu presents a characteristic blackish purple or blackish brown color because of the materials and manufacturing process and thus colors the cuisine darkly when used as a seasoning. Thus, the color of the shoyu sometimes spoils the original colors and features of the materials with which the cuisines are prepared depending on the kinds of cuisines. For this reason, shoyu could not be used for some of the cuisines even when the taste, aroma and flavor of the shoyu were desirable for the cuisines. Thus, the use of shoyu has been limited. For example, the fresh Japanese radish and turnip cut into slices or into long thin strips are appreciated for their fresh whiteness, but such whiteness will turn into a pale brown color and thus spoil the original whiteness of the radish and turnip when a small amount of shoyu is added. Other examples are cases of the immature peas and immature kidney beans. These vegetables present an attractive fresh green color when boiled, but such green color turns dull when cooked with shoyu though the vegetables become more tasty. The same can be said in the case of a carrot appreciated for its fresh red color, as well as in the case of the white meat of fish.

SUMMARY OF THE INVENTION

An object of the present invention is to provide a shoyu wherefrom its peculiar color, that is, the blackish purple or blackish brown color is removed.

Another object of the present invention is to provide a shoyu with various colors such as red, blue, yellow, green, etc. which have not heretofore been used for the conventional shoyu.

A further object of the present invention is to provide a shoyu with various colors for a wide range of uses which have never been realized before.

The shoyu based on the present invention is rid of its peculiar blackish purple color or blackish brown color so that the shoyu can take any desired colors such as red, blue, yellow, green, etc. in order to accomplish the above objects.

The shoyu with such unconventional colors can be utilized for a variety of cuisines as well as new cuisines, making the best use of its colors.

DETAILED DESCRIPTION OF THE PREFERRED EMBODIMENT

The following process chart illustrates a typical manufacturing process chart of the conventional shoyu.

In the case of the manufacturing process, 1,170 kg of soybean is soaked in water or low-temperature hot water until the weight of the soybeans is nearly doubled by absorbing the water. Then, the soybeans are cooked in a cooker for about two hours, and 1,000 kg of roasted and crushed wheat and 1.23 kg of spores aspergillus are mixed with the soybeans. The mixture is placed in a thermostatic chamber for 8 to 9 hours at a temperature within the range of 26° to 27° C. to facilitate the propagation of "koji" mold. As the "koji" mold propagates, the mixture generates heat. The internal temperature and the humidity should be maintained within 26° to 27° C. and 92 to 93% respectively, and during such period of time the mixture should be stirred 2 to 3 times. Then, 2,170 kg of "koji" will be obtained after three days. For the spores aspergilus, apergillus oryzae, aspergillus sojae, etc. with a high protein decomposition capacity and high propagation capacity is preferable. The thus obtained "koji" is mixed with saline water prepared by dissolving 925 kg of salt into 3,550 liters of water, and the mixture is put in a large fermentation tank for maturing. This mixture is called "moromi", which needs to be stirred occasionally so that air is supplied inside to facilitate the steady progress of fermentation. It takes about one year for the "moromi" to mature completely. The matured "moromi" is pressed to be divided into liquid and solid. The liquid obtained is about 5,620 kg in quantity. The liquid is called the "kiage shoyu" (fresh soy sauce). The "kiage shoyu" is heated at 80° C. for pasteurization, and left for a while for the sedimentation of dregs to be removed to obtain the clear liquid, which is called the "koikuchi shoyu" (soy sauce of common type) that is most popularly consumed. The "koikuchi shoyu" is obtained in the quantity of about 5,310 Kg and exhibits a characteristic blackish purple or blackish brown color.

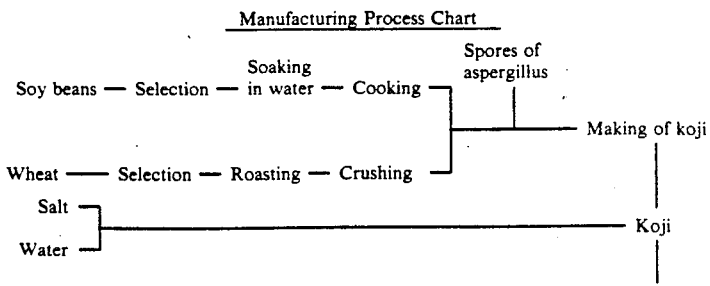

Manufacturing Process Chart

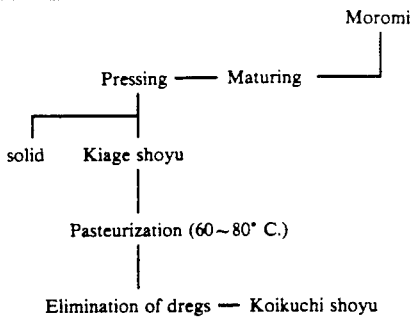

-continued

```
                                          Moromi
                                            |
                    Pressing ──── Maturing ─┘
                        |
            ┌───────────┤
          solid    Kiage shoyu
                        |
              Pasteurization (60~80° C.)
                        |
         Elimination of dregs ── Koikuchi shoyu
```

A "saishikomi shoyu" (soy sauce of refermented type) can be produced using the "kiage shoyu" instead of saline water in making the "moromi" though the rest of the manufacturing process is the same as that for the "koikuchi shoyu." The "saishikomi shoyu" has a little higher viscosity, thicker color and richer components (ingredients) compared with those of the "koikuchi shoyu."

A "Misodama" or miso ball is produced by roughly crushing the steamed soybeans after cooling. Then, the "misodama" is mixed with the "koji" taken from the cultured "koji" mold and some saline water. The mixture is put in a fermentation tank for maturing. The liquid separated naturally from the mixture is collected and heated for pasteurization to produce the "tamari shoyu".

In addition, an "usukuchi shoyu" (soy sauce of light color type) is produced by the "koji" obtained at a lower temperature and the "moromi" obtained by adding a larger quantity of saline water and by reduced stirring than the case of the manufacturing process for the "koikuchi shoyu." The "usukuchi shoyu" is characterized by a lighter color and larger salt content compared with the "koikuchi shoyu" as shown in the following table.

The common components of various types of shoyu are as shown in the following table:

TABLE

| Type | | Koikuchi | Usukuchi | Tamari | Saishikomi |
|---|---|---|---|---|---|
| Components | | | | | |
| Energy | kcal | 58 | 48 | 76 | 94 |
| Water | | 69.5 | 70.9 | 64.3 | 62.5 |
| Protein | | 7.5 | 5.7 | 10.0 | 9.4 |
| Lipid | g | 0 | 0 | 0 | 0 |
| Carbohydrate | | | | | |
| Sugar | | 7.1 | 6.3 | 9.0 | 14.1 |
| Fiber | | 0 | 0 | 0 | 0 |
| Ash | | 15.9 | 17.1 | 16.7 | 14.0 |
| Minerals | | | | | |
| Calcium | | 21 | 18 | 30 | 35 |
| Phosphorus | | 140 | 110 | 200 | 200 |
| Iron | mg | 2.3 | 2.1 | 3.9 | 5.7 |
| Sodium | | 5900 | 6400 | 5900 | 4900 |
| Potassium | | 400 | 330 | 720 | 560 |
| Vitamins | | | | | |
| A | IU | 0 | 0 | 0 | 0 |
| B1 | | 0.05 | 0.05 | 0.04 | 0.05 |
| B2 | mg | 0.19 | 0.10 | 0.14 | 0.21 |
| Niacin | | 1.1 | 0.7 | 1.1 | 1.8 |
| C | | 0 | 0 | 0 | 0 |
| Remarks | | *1 | *2 | *3 | *4 |
| Type | | Koikuchi | Usukuchi | Tamari | Saishikomi |
| | | (per 100 g) | | | |

Note:
*1 Specific gravity 1.18 Salt Equivalence 15.0 g
*2 Specific gravity 1.18 Salt equivalence 16.3 g
*3 Specific gravity 1.21 Salt equivalence 15.0 g
*4 Specific gravity 1.21 Salt equivalence 12.4 g According to the present invention, the "koikuchi shoyu," "kiage shoyu," "saishikomi shoyu," "tamari shoyu" and "usukuchi shoyu" can be colored in any desired colors. The coloring procedure will be explained hereafter.

Various types of shoyu are decolored so that they can be colored in any desired colors. For decoloring the shoyu, charcoal, decolorizing resin, synthetic adsorbent, ion-exchange resin, activated clay and other decoloring agents may be used. The decolorization of the shoyu by decolorizing agents is made in two types of operation: one is a batch operation wherein the decolorizing agents are mixed in the shoyu for decolorization and removed by filter after completing the decolorization and the other is a column operation wherein the decolorizing agents are packed in a column so that the shoyu can be made to pass through the decolorizing agents.

In addition, the ultrafiltration method and the reverse osmosis membrane method, preferably the loose reverse osmosis membrane type method, may also be used for the decolorization of the shoyu. In the case of the former method, the flavor-constituting components, mainly consisting of the nitrogen compounds such as amino acid, and some other components will be lost to a little extent, but the taste, aroma and flavor peculiar to the shoyu are little affected. In the case of the latter method, the loss of the flavor-constituting components is smaller than the case of the former method, and thus the use of the latter method is preferable. Both of these decolorizing methods produce no ill effects on the shoyu.

The decolorization of the shoyu may be accomplished by appropriate methods other than those described in the above, and more than two methods may be combined for more effective decolorization.

As described in the foregoing, when the decolorization of a shoyu is performed, especially using the decolorizing agent, a part of some components of the shoyu such as the nitrogen component will be lost sometimes simultaneously with the progress of the decolorization action. In such a case, the lost components can be supplemented for improving the quality of the shoyu.

The decolorized shoyu can be colored in any desired colors with a natural coloring agent or a synthetic coloring agent. As the natural coloring agents, for example monascus pigment, safflower yellow pigment, gardenia pigment, annatto pigment, cochineel pigment, beet red pigment, paprika pigment and other pigments can be used for the coloring of the shoyu. Also, the synthetic coloring agents which can be used for the shoyu include the following pigments, for example, ← Amaranth, Erythrosine, New coccine, Eosine, Phloxine, Rose bengale, Acid red, Tartrazine, Sunset yellow FCF, Light green SF yellowish, Fast green FCF, Brilliant blue FCF, Indigo carmine and the food color aluminum lakes of these pigments.

The above pigments can be used either singly or in combination so that any desired colors such as red, blue, yellow, green, etc. can be obtained for use in producing the improved shoyu according to the present invention.

Thus, the improved shoyu can present new colors different from the color peculiar to the conventional shoyu. The improved shoyu is expected to have the following uses. For example, pouring some red-colored shoyu onto the center of some Japanese radish cut into long thin strips in a small china creates an eye-catching contrast of the whiteness of the radish and the red of the shoyu, and makes the radish tasty to stimulate the appetite. Also, when immature garden peas are boiled with water containing some green-colored shoyu, the cooked garden peas maintain their original fresh green color even after the shoyu is absorbed into the peas and the taste is good. Furthermore, when a piece of fish with reddish skin and white meat such as red sea bream is cooked with some red-colored or colorless shoyu, its original reddish skin color is enhanced.

As is obvious from the above examples, the improved shoyu available in various colors can be used selectively depending on the original colors of the materials to be cooked so that cuisines with desired taste and color can be prepared, and this not only expands the variety of the cuisines but also enables the creation of new cuisines. Furthermore, the improved shoyu may be used as one of the table seasonings for dining to make the eating habits of people more diversified and more enjoyable.

The manufacturing processes of the improved shoyu will be described hereafter.

EXAMPLE 1

100 g of active carbon was added to 2,000 ml of commercially available "koikuchi shoyu" (Chromaticity: Standard color: No. 11, Absorbance E: 3.2 at 530 mm, Salt content: 16.5 g/dl, Aggregate of nitrogen: 1.56 g/dl). The mixture was stirred for 30 minutes, and 1,600 ml of filtrate (Chromaticity: No applicable chromaticity since the filterate is colorless, Absorbance E: 0.015 at 530 mm) was obtained by separating the mixture with a centrifuge.

The monuscus pigment: Hokuto Red No. 8026 (Trade name of monuscus pigment made by Hokuto Kasei Co., Ltd.), 0.9%, was added to the filtrate to obtain a red-colored shoyu.

Similarly, a yellow-colored shoyu was obtained by adding 0.5% of the safflower yellow pigment: Hokuto Yellow SL-A (the product of the same manufacturer as above) to the filtrate.

Also, similarly, 0.4% of the enzyme treated gardenia pigment: Hokuto Green No. 8302 (the product of the same manufacturer as above) was added to the filtrate to obtain a green-colored shoyu.

Similarly, 0.3% of the enzyme treated gardenia pigment: Gardenia Blue A-T Taito (Trade name of the product of Taito Co., Ltd.) was added to the filtrate to obtain a blue-colored shoyu.

Similarly, 0.5% of the gardenia pigment: TS Grape No. 8U (Trade name of the product of Taito Co., Ltd.) was added to the filtrate to obtain a purple-colored shoyu.

All these improved types of shoyu present transparent and bright colors, and no fading was observed.

EXAMPLE 2

1,000 ml of the granular active carbon: Diahope (Trade name of the product of Mitsubushi Chemical Industries Ltd.) packed in a glass column (48 mm in diameter and 700 mm in length) was washed with water and deaerated. Then, the appropriate quantity of the "kiage shoyu" (Chromaticity: Standard color No. 26, Absorbance E: 1.67 at 530 mm, Salt content: 16.8 g/dl, Aggregate quantity of nitrogen: 1.86 g/dl) was passed through the active carbon in the glass column at a flow rate of 500 ml/hr, and 3,000 ml of colorless filtrate (Chromaticity: No applicable standard color No. due to being colorless, Absorbance E: 0.012 at 530 mm) was obtained.

The filtrate was processed by the following methods to obtain shoyu with various colors.

0.025% of new coccin was added to 100 ml of the filtrate to obtain a red-colored shoyu.

Similarly, 0.005% of new coccin and 0.025% of tartrazine were added to obtain an orange-colored shoyu.

Similarly, 0.025% of tartrazine was added to the filtrate to obtain a yellow-colored shoyu.

Similarly, 0.01% of brilliant blue FCF was added to the filtrate to obtain a blue-colored shoyu.

Similarly, 0.0006% of brilliant blue FCF and 0.009% of new coccine were added to obtain a purple-colored shoyu.

All these improved types of shoyu present transparent and bright colors, and no fading was observed as in the cases of Example 1.

What is claimed is:

1. A colored shoyu comprising a decolorized and recolored shoyu liquid separated from a mixture of soybeans and wheat fermented by koji mold, the shoyu having an effective amount of coloring agent therein, and wherein the coloring agent is one other than a blackish purple or blackish brown color.

2. A colored shoyu according to claim 1; wherein the shoyu is a koikuchi shoyu.

3. A colored shoyu according to claim 1; wherein the shoyu is a kiage shoyu.

4. A colored shoyu according to claim 1; wherein the shoyu is an usukuchi shoyu.

5. A colored shoyu according to claim 1; wherein the shoyu is a saishikomi shoyu.

6. A colored shoyu according to claim 1; wherein the shoyu is a tamari shoyu.

7. A colored shoyu according to claim 1; wherein the coloring agent comprises a natural coloring agent.

8. A colored shoyu according to claim 1; wherein the coloring agent comprises a synthetic coloring agent.

9. A colored shoyu according to claim 1; wherein the coloring agent is a red color.

10. A colored shoyu according to claim 1; wherein the coloring agent is a blue color.

11. A colored shoyu according to claim 1; wherein the coloring agent is a yellow color.

12. A colored shoyu according to claim 1; wherein the coloring agent is a green color.

13. A colored shoyu according to claim 1; wherein the coloring agent is a purple color.

14. A colored shoyu according to claim 11; wherein the coloring agent is an orange color.

15. A colored shoyu according to claim 1; wherein the colored shoyu is transparent.

16. A process of manufacturing colored shoyu comprising the steps:

provided a shoyu consisting essentially of a liquid mixture of soybeans and wheat fermented by koji mold and having a characteristic blackish purple or blackish brown color;

decolorizing the shoyu to remove therefrom the characteristic blackish purple or blackish brown color; and coloring the decolorized shoyu by adding thereto a coloring agent in an amount effective to impart thereto a desired color other than the original characteristic blackish purple or blackish brown color.

17. A process according to claim 16; wherein the colorizing step comprises coloring the decolorized shoyu by adding thereto a natural coloring agent.

18. A process according to claim 16; wherein the coloring step comprises coloring the decolorized shoyu by adding thereto a synthetic coloring agent.

19. A process according to claim 16; wherein the providing step comprises providing a shoyu selected from the group consisting of koikuchi shoyu, kiage shoyu, saishikomi shoyu, tamari shoyu and usukuchi shoyu.

20. A process according to claim 16; wherein the decolorizing step comprises decolorizing the shoyu using active carbon.

21. A process according to claim 16; wherein the decolorizing step is carried out using ultrafiltration.

22. A process according to claim 16; wherein the decolorizing step is carried out using an osmosis membrane.

* * * * *